J. ELGAR.
Straw Cutter.
No. 5,159.
Patented June 19, 1847.
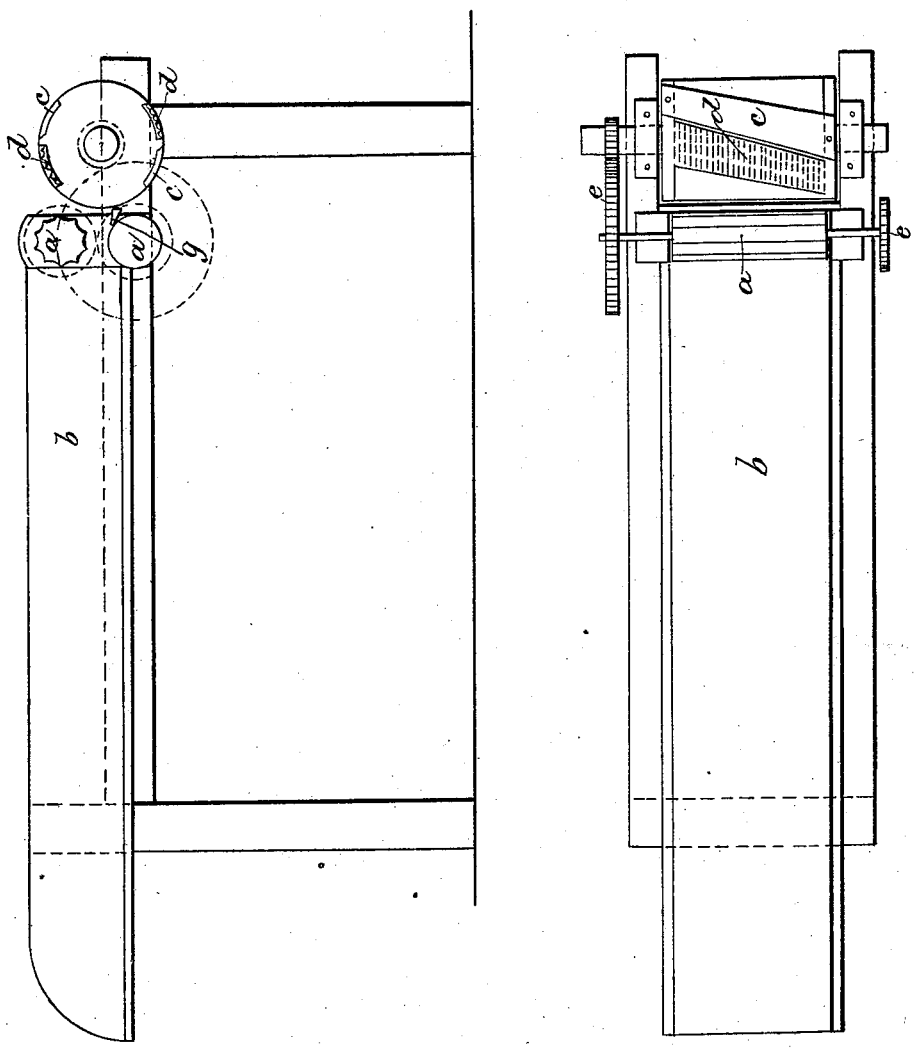

UNITED STATES PATENT OFFICE.

JNO. ELGAR, OF BALTIMORE, MARYLAND.

MACHINE FOR CUTTING CORN-FODDER.

Specification of Letters Patent No. 5,159, dated June 19, 1847.

*To all whom it may concern:*

Be it known that I, JOHN ELGAR, of the city of Baltimore and State of Maryland, have invented new and useful Improvements in Machines for Preparing Corn-Fodder for Feeding Stock, and that the following is a full, clear, and exact description of the principle or character which distinguishes them from all other things before known and of the manner of making, constructing, and using the same, reference being had to the accompanying drawings, making part of the specification, in which—

Figure 1 is a side elevation of the machine, and Fig. 2, a top plan.

The same letters indicate like parts in both figures.

The nature of my invention consists in abrading the ends of the fodder before they are cut off, instead of first cutting off the fodder and then grinding it, as is done in the machines now in use. It is fed into the machine by feed rollers (*a, a*) in any convenient way through a trough (*b*) of ordinary construction and supported on legs like a straw cutting box; at the front end of this box there is a cylinder of knives (*c*) (two, more or less) put on angularly and twisting similar to those used in a machine for cutting straw known as the "Eastman Machine." Just in front of each of the knives, a plate (*d*) is located parallel with said knives and armed on its outer face with chisel pointed teeth or short lances which I denominate "lacerators," which as the cylinder revolves abrade the ends of the fodder before they are cut off by the knife, so that when the cut fodder falls from the knife it is finished ready for food. This mode of operation prevents clogging and insures a perfect action upon every part of the fodder. It is obvious that the knives can be dispensed with if the fodder is to be only lacerated; or if the machine is wanted for cutting straw or such like purposes, the plates can be removed and the knives only used. The lacerators can be placed in a sliding gate or plate wheel as well as in a revolving cylinder, and with similar effect. The plate and lacerators can be made of cast iron or other suitable material.

Having thus fully described my improvements, what I claim as my invention and desire to secure by Letters Patent is—

Preparing corn fodder for food for cattle by the employment of lacerators in the manners described for abrading the fodder while held by feeding apparatus and before the action of the knife, as described, and in combination therewith the knives for cutting it off after it has been lacerated, substantially as above set forth.

JOHN ELGAR.

Witnesses:
   J. J. GREENOUGH,
   A. P. BROWNE.